US009663090B2

(12) United States Patent
Pursifull

(10) Patent No.: US 9,663,090 B2
(45) Date of Patent: May 30, 2017

(54) BRAKE BOOSTER ASSISTANCE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1018 days.

(21) Appl. No.: 13/685,569

(22) Filed: Nov. 26, 2012

(65) Prior Publication Data

US 2014/0144128 A1  May 29, 2014

(51) Int. Cl.
B60T 17/02 (2006.01)
F02M 35/10 (2006.01)
B60T 13/52 (2006.01)
B60T 13/565 (2006.01)

(52) U.S. Cl.
CPC .............. *B60T 17/02* (2013.01); *B60T 13/52* (2013.01); *B60T 13/565* (2013.01); *F02M 35/10229* (2013.01)

(58) Field of Classification Search
CPC ........ B60T 17/02; B60T 13/52; B60T 13/565; B60T 13/72; F02M 35/10229
See application file for complete search history.

(56) References Cited

U.S. PATENT DOCUMENTS

| 2,746,255 | A | * | 5/1956 | Fitch | B60T 13/244 137/204 |
| 4,738,112 | A | * | 4/1988 | Nomura | B60T 17/02 303/12 |
| 5,961,189 | A | * | 10/1999 | Lutteke | B60T 8/4013 188/355 |
| 6,116,141 | A | | 9/2000 | Levrai | |
| 6,244,676 | B1 | | 6/2001 | Watanabe et al. | |
| 6,457,785 | B1 | | 10/2002 | Yonemura et al. | |
| 7,475,951 | B2 | * | 1/2009 | Ichikawa | B60K 6/543 188/356 |
| 2012/0096849 | A1 | | 4/2012 | Cunningham et al. | |
| 2012/0253574 | A1 | * | 10/2012 | Krueger | B60T 8/4036 701/22 |

FOREIGN PATENT DOCUMENTS

DE  100005011 A1 * 7/2001
GB  2344389     * 6/2000
(Continued)

OTHER PUBLICATIONS

DE100005011A1 machine translation to English. 2001.*
(Continued)

*Primary Examiner* — Eric Keasel
*Assistant Examiner* — Michael Quandt
(74) *Attorney, Agent, or Firm* — Julia Voutyras; McCoy Russell LLP

(57) ABSTRACT

Systems and methods for a vehicle brake booster having first and second chambers separated by a diaphragm coupled to a brake pedal are provided. In one example approach, a method comprises applying an exhaust pressure from a vacuum pump to a first chamber of the brake booster, and applying a vacuum pressure from the vacuum pump to a second chamber of the brake booster.

17 Claims, 4 Drawing Sheets

(56) References Cited

FOREIGN PATENT DOCUMENTS

| | | | | |
|---|---|---|---|---|
| JP | S64-22670 | A | * | 1/1989 |
| JP | 2003201927 | A | * | 7/2003 |

OTHER PUBLICATIONS

JPS64-22670A abstract provided by espacenet. 1989.*
JPS64622670A translation. 1989.*
JPS2003201927 translation. 2003.*
Anonymous, "A Combined Aspirator with an Integrated Dual Check Valve Assembly," IPCOM No. 000239163, Published Oct. 17, 2014, 2 pages.

* cited by examiner

BRAKE BOOSTER ASSISTANCE

BACKGROUND AND SUMMARY

Brake booster systems are generally known to assist a vehicle operator in applying force to a brake pedal by establishing a pressure differential across a diaphragm of a brake boosting device that is coupled to the brake pedal. During braking, chambers on each side of the diaphragm are separated such that a working chamber closest to the driver is at atmospheric pressure while the other side of the diaphragm is coupled to an engine air intake manifold and therefore may be at a lower pressure. Other configurations may further use an electrically-powered vacuum pump (EVP) to supply at least some brake booster vacuum. In still another approach described in US 2012/0096849 A1, boosted air from the air compressor of an engine turbocharger may be applied to the brake booster working chamber.

The inventor herein has recognized a disadvantage of these approaches in that a desired pressure differential across the diaphragm may not be maintained at all engine operating conditions or at all altitudes. For example, under certain engine operating conditions pressurized air from the turbocharger may not be available for the working chamber and ambient air pressure may vary with altitude. The inventor herein has addressed this issue by applying an exhaust pressure from a vacuum pump to the working chamber, and applying a vacuum pressure from the vacuum pump to vacuum chamber.

It should be understood that the summary above is provided to introduce in simplified form a selection of concepts that are further described in the Detailed Description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
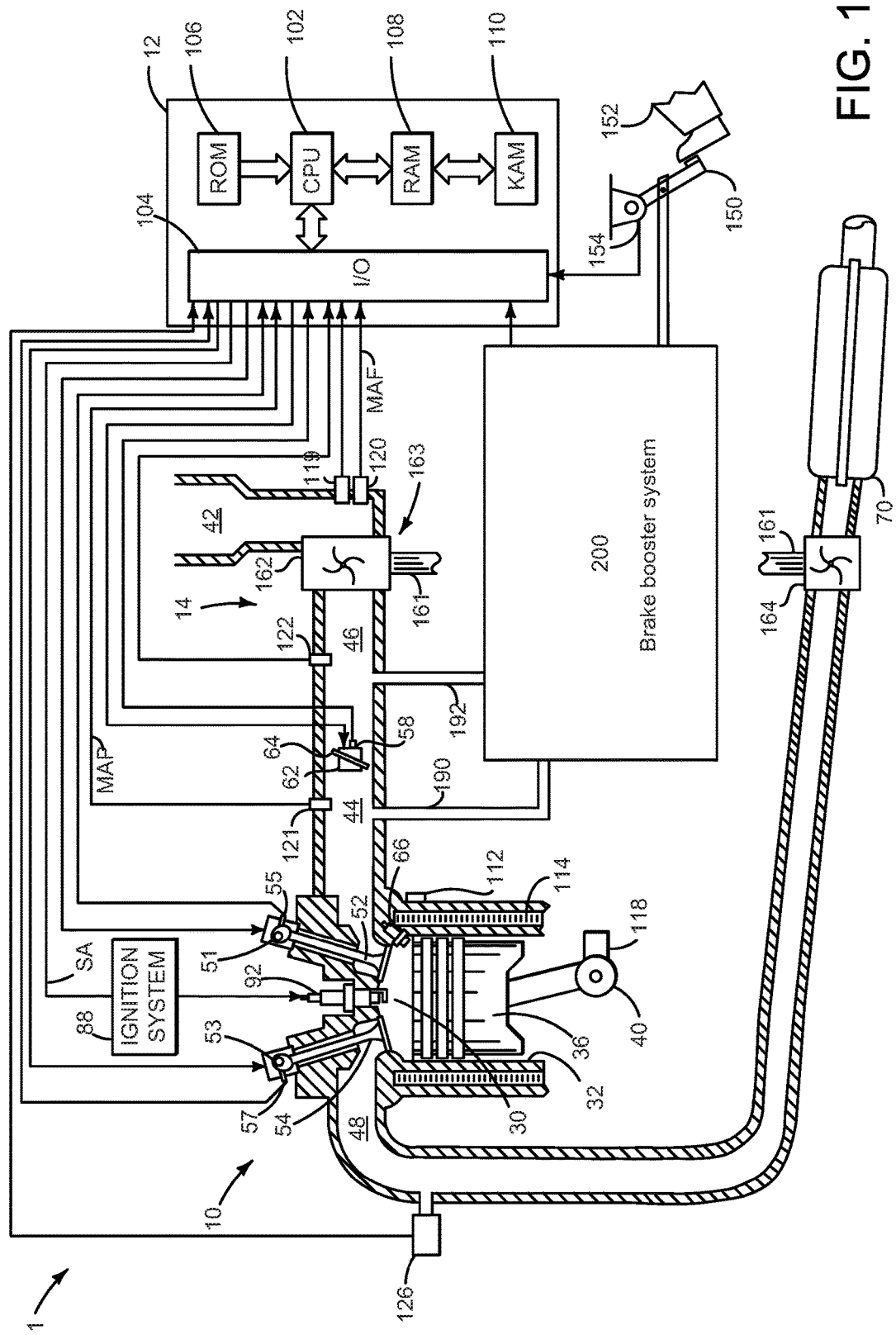
FIG. 1 shows a schematic depiction of a vehicle including an engine and a brake booster system.

The present description relates to systems and methods for operating a brake booster system in a vehicle, such as the vehicle shown in FIG. 1, using an electrically driven vacuum pump. More specifically, the present description relates to operating an electrically driven vacuum pump to apply both a vacuum and a positively-pressurized air source to respective vacuum chambers and working chambers of a brake booster system, such as the brake booster system shown in FIG. 2. In some examples, a controller may be configured to perform some or part of these routines, as further illustrated in FIGS. 3-4.

FIG. 1 shows a schematic depiction of a vehicle system 1. The vehicle system 1 includes an internal combustion engine 10. The internal combustion engine 10 comprises a plurality of cylinders, one cylinder of which is shown in FIG. 1, and is controlled by an electronic engine controller 12. The engine 10 includes a combustion chamber 30 and cylinder walls 32 with a piston 36 positioned therein and connected to a crankshaft 40.

An air intake system 14 may be coupled to the engine 10. The air intake system 14 includes an air intake 42, a compressor 162 of a turbocharger 163, a boost chamber 46, an intake manifold 44 and a throttle valve 62. The air intake 42 may be positioned upstream of the compressor 162 of the turbocharger 163. The boost chamber 46 and the intake manifold 44 may be positioned downstream of the compressor 162 of the turbocharger 163. The throttle valve 62 may be positioned in the intake manifold 44 downstream of the boost chamber 46.

The combustion chamber 30 is shown communicating with the intake manifold 44 and an exhaust manifold 48 via respective intake valve 52 and exhaust valve 54. Each intake and exhaust valve may be operated by an intake cam 51 and an exhaust cam 53. In some embodiments, one or more of the intake and exhaust valves may be operated by an electromechanically controlled valve coil and armature assembly. The position of an intake cam 51 may be determined by an intake cam sensor 55. The position of an exhaust cam 53 may be determined by an exhaust cam sensor 57.

A fuel injector 66 is shown positioned to inject fuel directly into the cylinder 30, which is known to those skilled in the art as direct injection. Alternatively, fuel may be injected to an intake port, which is known to those skilled in the art as port injection. The fuel injector 66 delivers liquid fuel in proportion to a pulse width of signal FPW that may be sent from the controller 12. Fuel is delivered to the fuel injector 66 by a fuel system (not shown) including a fuel tank, fuel pump, and fuel rail (not shown). The fuel injector 66 is supplied operating current from an electronic driver 95 which responds to the controller 12. In addition, the intake manifold 44 is shown communicating with the throttle valve 62 which adjusts a position of a throttle plate 64 to control air flow from the intake boost chamber 46.

The compressor 162 draws air from the air intake 42 to supply the boost chamber 46 and the intake manifold 44. Exhaust gases spin a turbine 164 of the turbocharger 163 which is coupled to the compressor 162 via a shaft 161. A waste gate actuator (not shown) may allow exhaust gases to bypass the turbine 164 so that boost pressure can be controlled under varying operating conditions.

A distributorless ignition system 88 provides an ignition spark to the combustion chamber 30 via a spark plug 92 in response to the controller 12. The controller 12 may be configured to adjust a spark timing of the ignition system 88 based on operating conditions. In one example, the controller 12 may be configured to retard a spark timing of the ignition system 88 to compensate for air being routed downstream of the turbocharger 163 into the intake manifold 44 relative to a spark timing when air is routed upstream of the turbocharger 163 into the air intake 42. A Universal Exhaust Gas Oxygen (UEGO) sensor 126 is shown coupled to the exhaust manifold 48 upstream of a catalytic converter 70. Alternatively, a two-state exhaust gas oxygen sensor may be substituted for UEGO sensor 126.

The converter 70 can include multiple catalyst bricks, in one example. In another example, multiple emission control devices, each with multiple bricks, can be used. The converter 70 can be a three-way type catalyst in one example.

The controller 12 is shown in FIG. 1 as a conventional microcomputer including: a microprocessor unit 102, input/ output ports 104, a read-only memory 106, a random access memory 108, a keep alive memory 110, and a conventional data bus. The controller 12 commands various engine actuators based on received sensor signal indicative of operating conditions of the vehicle. The controller 12 is shown receiving various signals from sensors coupled to engine 10, in addition to those signals previously discussed, including: engine coolant temperature (ECT) from a temperature sensor 112 coupled to a cooling sleeve 114; a position sensor 154 coupled to a brake pedal 150 for sensing brake pedal position; a knock sensor for determining ignition of end gases (not shown); a measurement of engine manifold pressure (MAP) from a pressure sensor 121 coupled to the intake manifold 44; a measurement of boost pressure from a pressure sensor 122 coupled to the boost chamber 46; an engine position sensor from a Hall effect sensor 118 sensing a crankshaft 40 position; a measurement of air mass entering the engine from a sensor 120 (e.g., a hot wire air flow meter); and a measurement of throttle position from sensor 58. Barometric pressure may be sensed by a pressure sensor 119 coupled to the air intake 42 for processing by the controller 12. Further, various pressure sensors may be used in brake booster system 200 for measuring pressures in various components of the brake booster system as described below.

Figure 4:
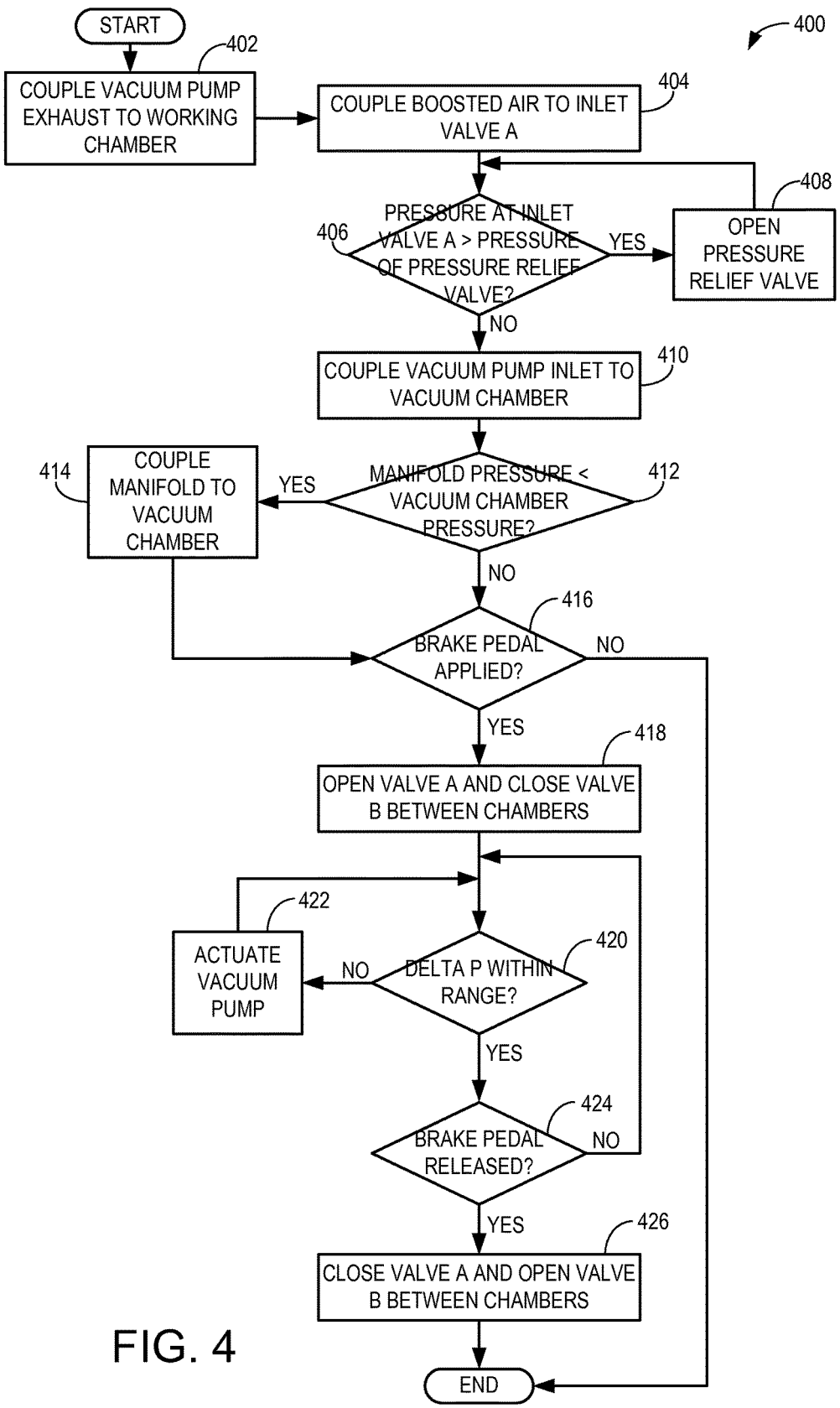
FIG. 4 shows another example method for controlling a brake booster system in accordance with the disclosure.

The storage medium read-only memory 106 can be programmed with computer readable data representing instructions executable by the processor 102 for performing control methods as described in FIGS. 4-5 as well as other variants that are anticipated but not specifically listed.

Vehicle 1 shown in FIG. 1 further includes a brake booster system 200 which is configured to amplify a force applied by a vehicle operator 152 to a brake pedal 150 to assist in braking. For example, as described in more detail below with regard to the example brake booster system shown in FIG. 2, a vacuum pump may be used as a source of both positively pressurized air and vacuum as applied to brake booster chambers. In one example, vacuum pump exhaust may be coupled to a working chamber of the brake booster while a vacuum pump inlet is coupled to a vacuum chamber of said brake booster. Additionally, positively-pressurized air may be sourced from downstream of a compressor in the intake manifold and applied to the working chamber of the brake booster in coordination with vacuum pump exhaust. A vacuum pump inlet may also be used with a second vacuum source from the intake manifold. This may enable vacuum pump operation to be limited to conditions where the intake manifold pressure rises above a desired vacuum pressure, for example.

Figure 2:
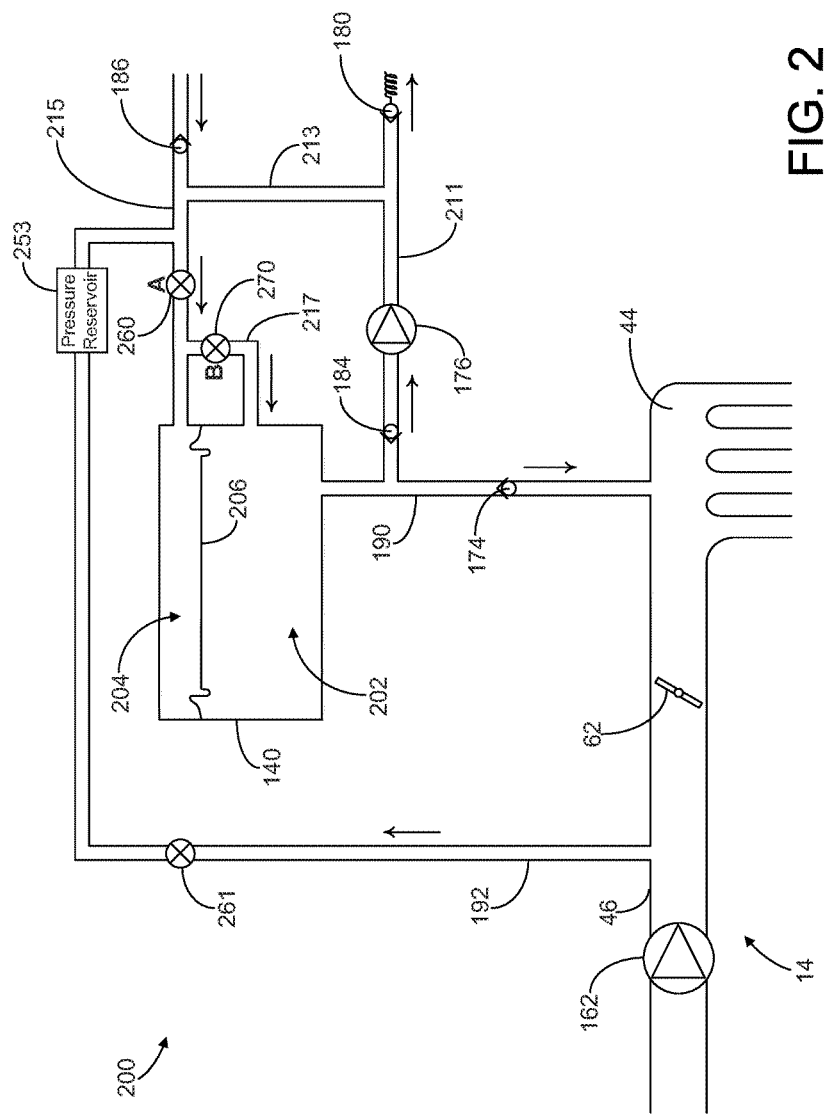
FIG. 2 shows a schematic depiction of an example brake booster system in accordance with the disclosure.

FIG. 2 shows a schematic depiction of an example brake booster system 200. Brake booster system 200 includes a brake booster 140 configured to amplify a force applied by a vehicle operator to a brake pedal. For example, as shown in FIG. 1 described above, brake booster system 200 may be coupled to a brake pedal 150.

A housing of brake booster 140 may enclose a first chamber and a second chamber separated by a diaphragm. For example, a diaphragm 206 in brake booster 140 partitions and isolates brake booster 140 into a first or working chamber 204 and a second or vacuum chamber 202. Diaphragm 206 may be coupled to a brake pedal, e.g., brake pedal 150 shown in FIG. 1. For example, a spring (not shown) may bias diaphragm 206 toward the working chamber 204 when no operator brake pedal application is present. For example, a master cylinder control rod may transfer force applied to diaphragm 206 to the master cylinder which translates mechanical force from master cylinder control rod to hydraulic pressure for assisting in actuating vehicle brakes using vacuum in the brake booster.

Further, a vacuum pump outlet may be coupled to the first chamber (working chamber) to apply an exhaust pressure and a vacuum pump inlet may be coupled to the second chamber (vacuum chamber) to apply a vacuum pressure. For example, vacuum chamber 202 of brake booster 140 is shown pneumatically coupled to an electrically driven vacuum pump 176. Electrically driven vacuum pump 176 may be selectively operated via a control signal from the controller 12 to supply at least some vacuum, and/or positively pressured air, to the vacuum chamber 202 of brake booster 140. The electrically driven vacuum pump 176 is shown positioned between and fluidly coupled with the vacuum chamber 202 of brake booster 140 and the engine air intake system 14. In some embodiments, coupling the vacuum pump 176 and brake booster 140 to air intake 14 may be omitted such that vacuum pump 176 and vacuum chamber 202 of brake booster 140 are in fluid communication with the atmosphere. For example, a first conduit 190 may couple an inlet side of vacuum pump 176 with vacuum chamber 202 of brake booster 140. As shown in FIG. 2, in some examples, first conduit 190 may further be coupled to the intake manifold 44 downstream of throttle 62 and may include a check valve 174 disposed therein between brake booster 140 and intake manifold 44. This may allow air flow from brake booster 140 to intake manifold 44 when a pressure within the manifold is relatively lower and/or vacuum pump 176 is not actuated. A second check valve 184 may also be included in conduit 190 such that air flows from vacuum chamber 202 of brake booster 140 to an inlet of vacuum pump 176 during vacuum pump operation and not back into brake booster 140. For example, check valve 184 may be disposed in conduit 190 between brake booster 140 and pump 176.

A conduit 211 may couple an exhaust side of vacuum pump 176 to pressure relief valve 180. For example, pressure relief valve 180 may be configured to be opened to the atmosphere during certain conditions in order to adjust pressure in conduit 211. A conduit 213 may couple conduit 211 between pump 176 and pressure relief valve 180 to a conduit 215 coupled to working chamber 204 of brake booster 140. Conduit 215 may include a vacuum relief valve 186 (e.g. a vacuum breaker) disposed therein upstream of the coupling of conduit 213 with conduit 215 and a valve 260 (valve A) disposed therein downstream of the coupling of conduit 213 with conduit 215. Valve A may be coupled to a controller, e.g., controller 12, to be selectively opened or closed based on operating conditions as described below.

In some examples, a flow controlling orifice 261 may be included in line 192 so that compressor 162 can add to the pressure reservoir pressure without dumping all the boost pressure generated out of pressure relief valve 180. Further, in some examples, a pressure reservoir 253 may be included in line 192, 215, or 213 in order to ensure that enough pressure is available to fill chamber 204 during certain conditions. For example, to minimize vacuum consumption, it may be desirable to minimize the volume in chamber 204, e.g., during a foot-off brake pedal condition. During such a condition pressure in pressure reservoir 253 may be used to fill chamber 204 as it increases in volume.

Valves A and B are typically valves that are mechanical-pneumatically operated by an interaction of brake pedal force and chamber pressures. For example, increasing brake pedal force/displacement may open valve A and decreasing brake pedal force/displacement may open valve B. However, in some examples, valves A and B may also be operated via an electronic controller exclusively or redundantly.

In some examples, an air compressor may be coupled to first chamber 204, said compressor may also be coupled to supply compressed air to the engine intake manifold. Further, the intake manifold may be coupled to second chamber 202 of brake booster 140 to apply a manifold pressure when the manifold pressure is less than a vacuum pressure. For example, in some examples, a conduit 192 may be coupled to conduit 215 between valve A and the coupling of conduit 213 with conduit 215 and engine intake 46 between compressor 162 and throttle 62. Further, a conduit 217 may couple conduit 215 at a position downstream of valve A to vacuum chamber 202 of brake booster 140. Conduit 217 may include a second valve 270 (valve B) disposed therein. As described below, valve B may be selectively opened or closed, e.g., via controller 12, to put working chamber 204 in fluid communication with vacuum chamber 202 during certain operating conditions as described below. For example, valve B may be enabled to connect the first and second chambers in response to release of the brake pedal.

In this way the exhaust side of vacuum pump 176 is coupled with working chamber 204 of brake booster 140 and the intake side of vacuum pump 176 is coupled to vacuum chamber 202 of brake booster 140. As described below, valve A may be selectively adjusted to change an amount of pressure in working chamber 204 by selectively putting working chamber 204 in communication with the atmosphere and/or with intake 46 via conduit 192. Further valve B may be selectively adjusted to put working chamber 204 and vacuum chamber 202 of brake booster 140 in fluid communication during certain conditions, as described in more detail below. For example, pressure relief valve 180 may be configured to limit pressure in second conduit 192 such that pressure applied to working chamber 204 of brake booster 140 does not surpass a predetermined pressure. Further, vacuum relief valve 186 may be fluidly coupled to an external air source, e.g., the atmosphere, so that pressures within second conduit 192 and further applied to working chamber 204 of brake booster 140 do not fall below atmospheric pressure.

It will be appreciated that in some examples additional valves may be included in brake booster system 200 to regulate airflow between various components in the system. Further, the electrically driven vacuum pump may supply vacuum to one or more suitable vacuum consumption devices without departing from the scope of the present disclosure. For example, a vacuum consumption device may include at least one of a crankcase ventilation system, and a fuel vapor purge canister.

In the system shown in FIG. 2, air used in the brake system may be partially recycled. Recycling air in the brake system may reduce the propensity for water to condense out of the compressed air. However, the air compression is not intended to be large. For example, the compression might be 15 kPa with a BP of 85 kPa, or 30 kPa with a BP of 70 kPa. At high ambient humidity, one may choose to rely increasingly on vacuum pump 176 and less on compressor 162 (e.g., via solenoid valving) in an effort to reduce water condensing out of the compressed air.

Figure 3:
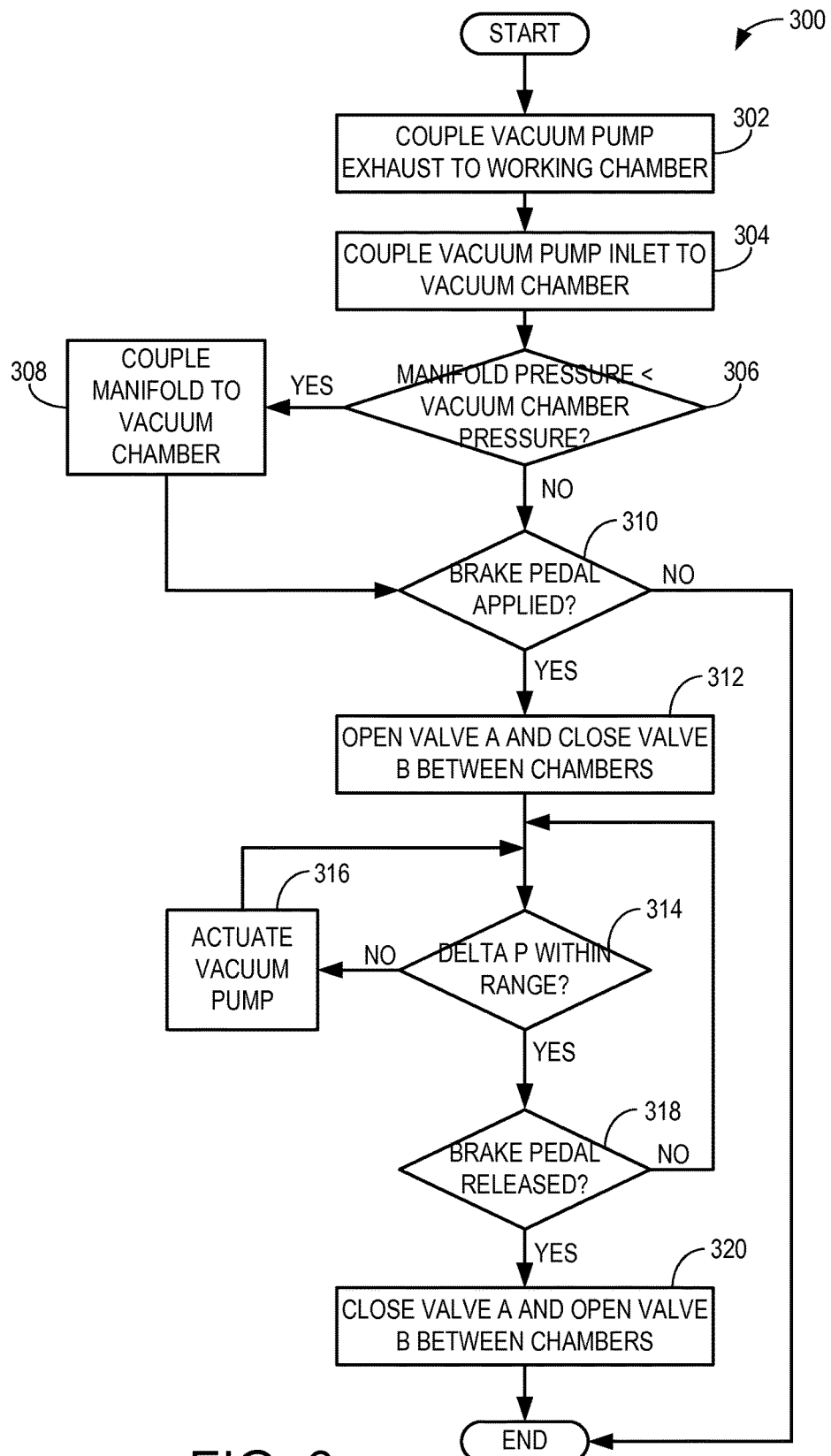
FIG. 3 shows an example method for controlling a brake booster system in accordance with the disclosure.

FIG. 3 shows an example method 300 for controlling a brake booster system, e.g., the vehicle brake booster system 200 having first and second chambers, 204 and 202, separated by a diaphragm 206 coupled to a brake pedal described above.

At 302, method 300 includes coupling a vacuum pump exhaust or outlet to a working chamber of a brake booster to apply an exhaust pressure from the vacuum pump to the first chamber. For example, as shown in FIG. 2, an outlet of vacuum pump 176 may be coupled to working chamber 204 of brake booster 140 via conduits 211, 213, and 215. Further, in some examples, a pressure relief may be used to keep exhaust pressure from the vacuum pump from exceeding a preselected pressure. For example, pressure relief valve 180 disposed in conduit 211 may be used to vent or relieve pressure in conduit 211 in response to a pressure being above a threshold value. Pressure relief valve 180 may be a mechanical relief valve with a preset pressure release or may be an electronically controlled valve that is actuated when a pressure measurement is above a predetermined pressure. Such a pressure measurement may be obtained from a pressure sensor disposed in conduit 211, 213, 215 or in working chamber 204, for example.

At 304, method 300 includes coupling a vacuum pump inlet to a vacuum chamber of the brake booster to apply a vacuum pressure from the vacuum pump to the vacuum chamber. For example, as shown in FIG. 2, an inlet of vacuum pump 176 may be coupled to second chamber (vacuum chamber) 202 via conduit 190 to provide vacuum pressure to the vacuum chamber.

At 306, method 300 includes determining if a manifold pressure is less than a pressure in the vacuum chamber of the brake booster. For example, a pressure reading from pressure sensor 121 coupled to the intake manifold 44 may be compared to a pressure reading from a pressure sensor disposed in vacuum chamber 202 of brake booster 140.

If the manifold pressure is less than the pressure in the vacuum chamber at 306, e.g., if the manifold pressure is less than the pressure in the vacuum chamber, then method 300 proceeds to 308. At 308, method 300 includes coupling the manifold to the vacuum chamber to apply a manifold pressure from an air intake manifold to the vacuum chamber (second chamber) of the brake booster. For example, as shown in FIG. 2, intake manifold 44 may be coupled to vacuum chamber 202 via conduit 190.

Further, in some examples, pressures in the intake manifold may be monitored, e.g., via pressure sensor 121, and vacuum pump 176 may be shut off in response to a predetermined manifold pressure. For example, if an amount of vacuum in intake manifold 44 increases above a threshold value, then vacuum pump 176 may be shut off since the intake manifold may provide sufficient vacuum to the brake booster. However, if the manifold pressure is greater than the pressure in the vacuum chamber at 306 or after coupling the manifold to the vacuum chamber at 308, method 300 proceeds to 310. At 310, method 300 includes determining if a brake pedal is applied. If a brake pedal is not applied at 310, method 300 ends. However, if a brake pedal is applied at 310, method 300 proceeds to 312.

At 312, method 300 includes opening valve A and closing valve B between the working and vacuum chambers of the brake booster. For example, control valve 260 (valve A) may be opened and control valve 270 (valve B) may be closed so that valve A allows positively pressurized air into the working chamber 204 of brake booster 140. In this step, closing valve B discontinues fluid communication between the working chamber 204 and the vacuum chamber 202 of brake booster 140.

At 314, method 300 includes determining if a delta pressure is within a specified range. For example, a delta pressure may be a pressure differential between working chamber 204 and vacuum chamber 202. For example, a difference between a pressure reading from a pressure sensor coupled to working chamber 204 and a pressure reading from a pressure sensor coupled to vacuum chamber 202 may be used to calculate a pressure difference, delta P, between the two chambers. This delta pressure may be compared to a threshold delta pressure. The brake booster pressure differential may be determined as a value or a range of values and may be based on vehicle operating conditions, atmospheric conditions, brake booster mechanics, etc. This brake booster pressure differential may be determined by a controller 12 as shown in FIG. 1 or may be an arbitrary range of values as enabled by vacuum pump operation specifications, a pressure set-point of a pressure relief valve, etc. Similarly, the range of pressure differentials for optimal brake booster performance may include a determination of minimum and maximum values for air source pressures as in the case of the brake booster system being coupled to the intake manifold.

If a delta pressure is not within a specified range at 314, then method 300 proceeds to 316 to actuate the vacuum pump while continuing to monitor the delta pressure between the chambers in the brake booster. Actuating the vacuum pump may include, for example, increasing a duty cycle of the pump in order to increase a brake booster pressure differential (delta P). For example, increasing the brake pressure differential may be performed by applying a positively pressurized air source to the first chamber 204 of the brake booster and applying a vacuum source to the second chamber 202. Vacuum pump actuation may be coordinated such that a supply of both positive pressure and the vacuum experienced by the brake booster are adequately matched to increase the brake booster pressure differential. Further, in some examples, if the delta pressure across the diagram reaches a predetermined pressure difference, the vacuum pump may be shut off.

By using both the vacuum pump inlet and vacuum pump outlet as described above the pressure differential across diaphragm 206 will always be within a desired range regardless of engine operating conditions, intake manifold 44 pressure, engine boosting state, or altitude.

If the delta pressure is within the specified range at 314, then method 300 proceeds to 318. At 318, method 300 includes determining if the brake pedal is released. If the brake pedal is not released then method 300 continues to monitor the delta pressure and adjust the vacuum pump accordingly, as described above. However, if the brake pedal is released at 318, method 300 proceeds to 320.

At 320, method 300 includes closing valve A and opening valve B. For example, control valve 260 (valve A) may be closed and control valve 270 (valve B) may be opened so that valve A discontinues the positively pressurized air supply into the working chamber 204 of brake booster 140. In this step, opening valve B puts the working chamber 204 and the vacuum chamber 202 of brake booster 140 into fluid communication. In this way, pressure between the first chamber 204 and the second chamber 202 may be substantially equalized in response to a release of the brake pedal. Further, in some examples, vacuum pump 176 may be shut off or deactivated in this step.

An example implementation of the method shown in FIG. 3 is described in the following. For example, if there is a pressure reservoir, e.g., pressure reservoir 253, in conduit 215 this pressure reservoir may be the vehicle's cabin air which may be pressurized in this case. If, for example, pressure regulator 180 holds pressure at 215 to 30 kPa, then it may be desirable to maintain the vacuum in chamber 202 to a level such that the pressure at 215 minus the pressure in chamber 202 is at least 60 kPa. The brake booster's capability may be governed by the available pressure difference. For example, the available pressure difference may be the pressure in conduit 215 minus the pressure in chamber 202. In this example, only 40 kPa may be needed for brake booster operation in the worst case, but controlling to 60 kPa stores vacuum/pressure so that at least 40 kPa is still available after consumption.

In some examples, Valves A and B may be existing valves that open according to brake pedal application/release. The vacuum pump 176 may be run until a target pressure difference between the vacuum reservoir and the pressure reservoir is reached. Chamber 204 may not be used as a pressure reservoir; however, chamber 202 can be used as a vacuum reservoir. In some examples, the pressure relief point of valve 180 could be controlled so that it would vary based on atmospheric pressure. For example, the pressure relief point of valve 180 could be controlled to 0 at 100 kPa, 15 at 85, 30 at 70, etc. As another example, conduit 192 may be valved off if ambient humidity is high and the vacuum pump may be relied on alone in an attempt to recycle brake air instead of drawing in highly humid air since pressurizing humid air causes condensation which may degrade operation at temperatures below freezing. Further, when applying this to a Battery Electric Vehicle (BEV), conduits 174 and 192 may not be present and if this is applied this to a naturally aspirated vehicle, conduit 192 may not be present. However, even in these cases the system retains many of its advantages even without engine connections 192 and 174.

FIG. 4 shows another example method 400 for controlling a brake booster system, e.g., the vehicle brake booster system 200 having first and second chambers, 204 and 202, separated by a diaphragm 206 coupled to a brake pedal described above.

At 402, method 400 includes coupling a vacuum pump exhaust or outlet to a working chamber of a brake booster to apply an exhaust pressure from the vacuum pump to the first chamber. For example, as shown in FIG. 2, an outlet of vacuum pump 176 may be coupled to working chamber 204 of brake booster 140 via conduits 211, 213, and 215. Further, in some examples, a pressure relief may be used to keep exhaust pressure from the vacuum pump from exceeding a preselected pressure. For example, pressure relief valve 180 disposed in conduit 211 may be used to vent or relieve pressure in conduit 211 in response to a pressure measurement above a threshold value. Such a pressure measurement may be obtained from a pressure sensor disposed in conduit 211, 213, 215 or in working chamber 204, for example.

At 404, method 400 includes coupling boosted air to inlet valve A. For example conduit 192 may be used to couple pressurized air from downstream of compressor 162, or from some other suitable air compressor, to working chamber 204. This pressurized air may also be supplied to intake manifold 44 via intake 46. In some examples, a throttle, e.g., throttle 62, may be positioned between compressor 162 and an air intake manifold, e.g., intake manifold 44, to control said compressed air supplied to said intake manifold. Further, in some examples, a vacuum break may be actuated at a predetermined pressure, e.g., at atmospheric pressure. For example vacuum break 186 disposed in conduit 215 may be actuated at the predetermined pressure. Further, in some examples, the exhaust pressure from the outlet of vacuum pump 176 and the pressurized air from intake 46 may be directed to a pressure reservoir which in turn is coupled to the first chamber 204 of brake booster 140.

At 406, method 400 includes determining if a pressure at inlet valve A is greater than a pressure of a pressure relief valve. For example, a pressure reading from a pressure sensor disposed at valve A may be compared to a pressure reading from a pressure sensor disposed at or adjacent to pressure relief valve 180. As another example, pressure relief valve 180 may be configured to open in response to a pressure greater than a predetermined pressure, e.g., via a spring or other actuating mechanism.

If the pressure at the pressure relief valve is less than the pressure at inlet valve A at 406, then method 400 proceeds to 408. At 408, method 400 includes opening the pressure relief valve and continuing to monitor the pressure at inlet valve A and the pressure at the pressure relief valve at 406. If the pressure at the pressure relief valve is not less than the pressure at inlet valve A at 406, e.g., if the pressure at the pressure relief valve greater than the pressure at inlet valve A, then method 400 proceeds to 410.

At 410, method 400 includes coupling a vacuum pump inlet to a vacuum chamber of the brake booster to apply a vacuum pressure from the vacuum pump to the vacuum chamber. For example, as shown in FIG. 2, an inlet of vacuum pump 176 may be coupled to second chamber (vacuum chamber) 202 via conduit 190 to provide vacuum pressure to the vacuum chamber.

At 412, method 300 includes determining if a manifold pressure is less than a pressure in the vacuum chamber of the brake booster via mechanical check valve 174 positioned between vacuum chamber 202 and intake manifold 44. In another approach, a pressure reading from pressure sensor 121 coupled to the intake manifold 44 may be compared to a pressure reading from a pressure sensor disposed in vacuum chamber 202 of brake booster 140.

If the manifold pressure is less than the pressure in the vacuum chamber at 412, e.g., if the manifold pressure is less than the pressure in the vacuum chamber, then method 400 proceeds to 414. At 414, method 400 includes coupling the manifold to the vacuum chamber to apply a manifold pressure from an air intake manifold to the vacuum chamber (second chamber) of the brake booster. For example, as shown in FIG. 2, intake manifold 44 may be coupled to vacuum chamber 202 via conduit 190 and check valve 174. In some examples, the manifold pressure from intake manifold 44 and the vacuum pressure from pump 176 may be directed to a vacuum reservoir which in turn is coupled to vacuum chamber 202.

Further, in some examples, pressures in the intake manifold may be monitored, e.g., via pressure sensor 121, and vacuum pump 176 may be shut off in response to a predetermined manifold pressure. For example, if an amount of vacuum in intake manifold 44 increases above a threshold value, then vacuum pump 176 may be shut off. However, if the manifold pressure is greater than the pressure in the vacuum chamber at 412 or after coupling the manifold to the vacuum chamber at 414, method 400 proceeds to 416. At 416, method 400 includes determining if a brake pedal is applied. For example, a vehicle operator may initiate braking by applying a pressure to brake pedal 150 which is transmitted to brake booster 200 so that brake booster 140 may reduce an amount of force needed to apply braking. If a brake pedal is not applied at 416, method 400 ends. However, if a brake pedal is applied at 416, method 400 proceeds to 418.

At 418, method 400 includes opening valve A and closing valve B between the working and vacuum chambers of the brake booster. For example, control valve 260 (valve A) may be opened and control valve 270 (valve B) may be closed so that valve A allows positively pressurized air into the working chamber 203 of brake booster 140. In this step, closing valve B discontinues fluid communication between the working chamber 204 and the vacuum chamber 202 of brake booster 140.

At 420, method 400 includes determining if a delta pressure is within a specified range. For example, a delta pressure may be a pressure differential between working chamber 204 and vacuum chamber 202. For example, a difference between a pressure reading from a pressure sensor disposed in working chamber 204 and a pressure reading from a pressure sensor disposed in vacuum chamber 202 may be used to calculate a pressure difference, delta P, between the two chambers. This delta pressure may be compared to a threshold delta pressure. The brake booster pressure differential may be determined as a value or a range of values and may be based on vehicle operating conditions, atmospheric conditions, brake booster mechanics, etc. This brake booster pressure differential may be determined by a controller 12 as shown in FIG. 1 or may be an arbitrary range of values as enabled by vacuum pump operation specifications, a pressure set-point of a pressure relief valve, etc. Similarly, the range of pressure differentials for optimal brake booster performance may include a determination of minimum and maximum values for air source pressures as in the case of the brake booster system being coupled to the intake manifold.

If a delta pressure is not within a specified range at 420, then method 400 proceeds to 422 to actuate the vacuum pump while continuing to monitor the delta pressure between the chambers in the brake booster. Actuating the vacuum pump may include, for example, increasing a duty cycle of the pump in order to increase a brake booster pressure differential (delta P). For example, increasing the brake pressure differential may be performed by applying a positively pressurized air source to the first chamber 204 of the brake booster and applying a vacuum source to the second chamber 202. Vacuum pump actuation may be coordinated such that a supply of both positive pressure and the vacuum experienced by the brake booster are adequately matched to increase the brake booster pressure differential. Further, in some examples, if the delta pressure across the diagram reaches a predetermined pressure difference, the vacuum pump may be shut off.

If the delta pressure is within the specified range at 420, then method 400 proceeds to 424. At 424, method 400 includes determining if the brake pedal is released. If the brake pedal is not released then method 400 continues to monitor the delta pressure and adjust the vacuum pump accordingly, as described above. However, if the brake pedal is released at 424, method 400 proceeds to 426.

At 426, method 400 includes closing valve A and opening valve B. For example, control valve 260 (valve A) may be closed and control valve 270 (valve B) may be opened so that valve A discontinues the positively pressurized air supply into the working chamber 204 of brake booster 140. In this step, opening valve B puts the working chamber 204 and the vacuum chamber 202 of brake booster 140 into fluid communication. In this way, pressure between the first chamber 204 and the second chamber 202 may be substantially equalized in response to a release of the brake pedal. Further, in some examples, vacuum pump 176 may be shut off or deactivated in this step.

In this way, positively pressurized air with respect to atmospheric pressure may be applied to one side of a brake booster diaphragm while a vacuum with respect to atmospheric pressure may be applied to the other side of the brake booster diaphragm to actuate vehicle brakes. The brakes may be released by evacuating the positively pressurized air from one side of the diaphragm to the other side of the diaphragm and then into the engine for use during combustion of an air-fuel mixture. The present method of using both the vacuum pump inlet and vacuum pump outlet, as described above, maintains the pressure differential across diaphragm 206 within a desired range regardless of engine operating conditions, intake manifold 44 pressure, engine boosting state, or altitude.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle brake booster having first and second chambers separated by a diaphragm coupled to a brake pedal, comprising:
   applying an exhaust pressure from a vacuum pump to said first chamber;
   applying a vacuum pressure from said vacuum pump to said second chamber, and
   shutting off said vacuum pump in response to a predetermined air intake manifold pressure, and closing the control valve in response to the brake pedal being released,
   wherein the vacuum pump is fluidly coupled to an air intake manifold of an internal combustion engine in at least two locations,
   wherein a control valve interposes the vacuum pump and the first chamber, the control valve being located downstream of one of the at least two locations.

2. The method recited in claim 1 further comprising applying a manifold pressure from the air intake manifold to said second chamber when said manifold pressure is less than said vacuum pressure, and opening the control valve in response to the brake pedal being applied.

3. The method recited in claim 1 further comprising shutting off said vacuum pump in response to a predetermined pressure difference across said diaphragm.

4. The method recited in claim 1 further comprising:
   in response to a release of the brake pedal,
      equalizing pressure between said first and second chambers by opening a second control valve connecting the first and second chambers, and
      discontinuing a supply of positively pressurized air from a vacuum pump outlet and the air intake manifold to the first chamber by closing the control valve,
   in response to an application of the brake pedal,
      discontinuing fluid communication between the first and second chambers by closing the second control valve, and
      allowing positively pressurized air from the vacuum pump outlet and the air intake manifold upstream of a throttle to the first chamber by opening the control valve,
   wherein the at least two locations include upstream of the throttle and downstream of the throttle.

5. A method for controlling a vehicle brake booster having first and second chambers separated by a diaphragm coupled to a brake pedal, comprising:
   coupling an exhaust pressure from a vacuum pump to said first chamber;
   coupling a vacuum pressure from said vacuum pump to said second chamber;
   coupling said vacuum pump to an intake manifold of an internal combustion engine upstream of a throttle;
   coupling pressurized air from an air compressor to said first chamber, said compressor also supplying compressed air to said intake manifold; and
   providing a control valve to selectively disconnect the pressurized air and the exhaust pressure from the first chamber in response to a brake pedal position.

6. The method recited in claim 5 further comprising positioning the throttle between said air compressor and an air intake manifold to control said compressed air supplied to said intake manifold.

7. The method recited in claim 5 further comprising actuating a vacuum relief valve at a predetermined pressure, and wherein the control valve is opened in response to the brake pedal being applied.

8. The method recited in claim 7 wherein said predetermined pressure is atmospheric pressure, and wherein the control valve is closed in response to the brake pedal being released.

9. The method recited in claim 5 further comprising actuating a pressure relief valve to keep said exhaust pressure from exceeding a preselected pressure.

10. The method recited in claim 5 further comprising shutting off said vacuum pump in response to a predetermined pressure difference across said diaphragm.

11. The method recited in claim 5 further comprising equalizing pressure between said first and second chambers through a valve coupled between said chambers in response to release of said brake pedal.

12. The method recited in claim 5 further comprising shutting off said vacuum pump in response to a predetermined manifold pressure, wherein the control valve is provided between the vacuum pump and the first chamber, and wherein the control valve is further provided between the intake manifold of the internal combustion engine upstream of the throttle and the first chamber.

13. A vehicle brake booster system, comprising:
   an engine having an intake manifold;
   a brake booster housing enclosing a first chamber and a second chamber separated by a diaphragm;
   a vacuum pump having a vacuum pump outlet coupled to the first chamber to apply an exhaust pressure, and a vacuum pump inlet coupled to the second chamber to apply a vacuum pressure;
   a control valve disposed between the vacuum pump outlet and the first chamber;

wherein the vacuum pump is coupled to the intake manifold in at least two locations, the locations including upstream of a throttle and downstream of the throttle; and wherein the control valve is further disposed between the location upstream of the throttle and the first chamber.

14. The vehicle brake booster system of claim 13 further comprising a valve enabled to connect the first and second chambers in response to release of a brake pedal, where the control valve is operated to close in response to the release of the brake pedal, and where closing the control valve discontinues a supply of positively pressurized air from the vacuum pump outlet and intake manifold to the first chamber.

15. The vehicle brake booster system of claim 14 wherein said diaphragm is coupled to the brake pedal, where the valve is operated to discontinue fluid communication between the first and second chambers in response to the brake pedal being applied, and where the control valve is operated to open in response to the brake pedal being applied.

16. The vehicle brake booster system of claim 15 wherein said diaphragm is coupled to a master cylinder of a vehicle braking system, and wherein opening the control valve allows positively pressurized air from the vacuum pump outlet and the intake manifold upstream of the throttle to the first chamber.

17. The vehicle brake booster system of claim 13 further comprising an air compressor coupled to said first chamber, said compressor also coupled to supply compressed air to said intake manifold.

* * * * *